United States Patent [19]

More et al.

[11] Patent Number: 4,470,862

[45] Date of Patent: Sep. 11, 1984

[54] MANUFACTURE OF FIBER REINFORCED ARTICLES

[75] Inventors: Edwin R. More, Granville; Harry A. Nutter, Jr., Longmeadow, both of Mass.

[73] Assignee: United Technologies Corporation, Hartford, Conn.

[21] Appl. No.: 382,828

[22] Filed: May 27, 1982

[51] Int. Cl.³ ............................................. B29C 19/00
[52] U.S. Cl. .................. 156/245; 29/156.8 P; 156/217
[58] Field of Search ............................... 156/217, 245; 29/156.8 P; 244/62; 416/97 A; 264/46.6, 285, 287, 288

[56] References Cited

U.S. PATENT DOCUMENTS

| | | | |
|---|---|---|---|
| 2,630,868 | 3/1953 | Ellenberger | 156/245 |
| 2,890,147 | 6/1959 | Pearson et al. | 154/122 |
| 2,929,755 | 3/1960 | Porter | 154/90 |
| 3,140,846 | 7/1964 | Lott | 244/133 |
| 3,150,024 | 9/1964 | Penman | 156/229 |
| 3,321,019 | 5/1967 | Dmitroff et al. | 170/159 |
| 3,525,662 | 8/1970 | Padgett et al. | 161/67 |
| 3,682,738 | 8/1972 | Smith | 156/283 |
| 3,713,753 | 1/1973 | Brunsch | 416/226 |
| 3,873,654 | 3/1975 | Smith | 156/245 |
| 3,967,996 | 7/1976 | Kamov et al. | 156/156 |
| 4,051,289 | 9/1977 | Adamson | 428/113 |
| 4,168,197 | 9/1979 | Michimae et al. | 156/283 |
| 4,359,357 | 11/1982 | Friese | 156/217 |

Primary Examiner—Edward C. Kimlin
Assistant Examiner—Timothy W. Heitbrink
Attorney, Agent, or Firm—John Swiatocha

[57] ABSTRACT

In a method for manufacturing a fiber reinforced article, a plurality of sheets of fibrous material (38 and 40) each having minute quantities of a thermoplastic adhesive (50) on a single surface thereof are laid up on a suitable form such that the adhesive of each sheet is disposed in contact with an adjacent preceding sheet or form. The sheets are tailored to the form and adhesively bonded to one another by activation of the adhesive with heat and pressure.

9 Claims, 5 Drawing Figures

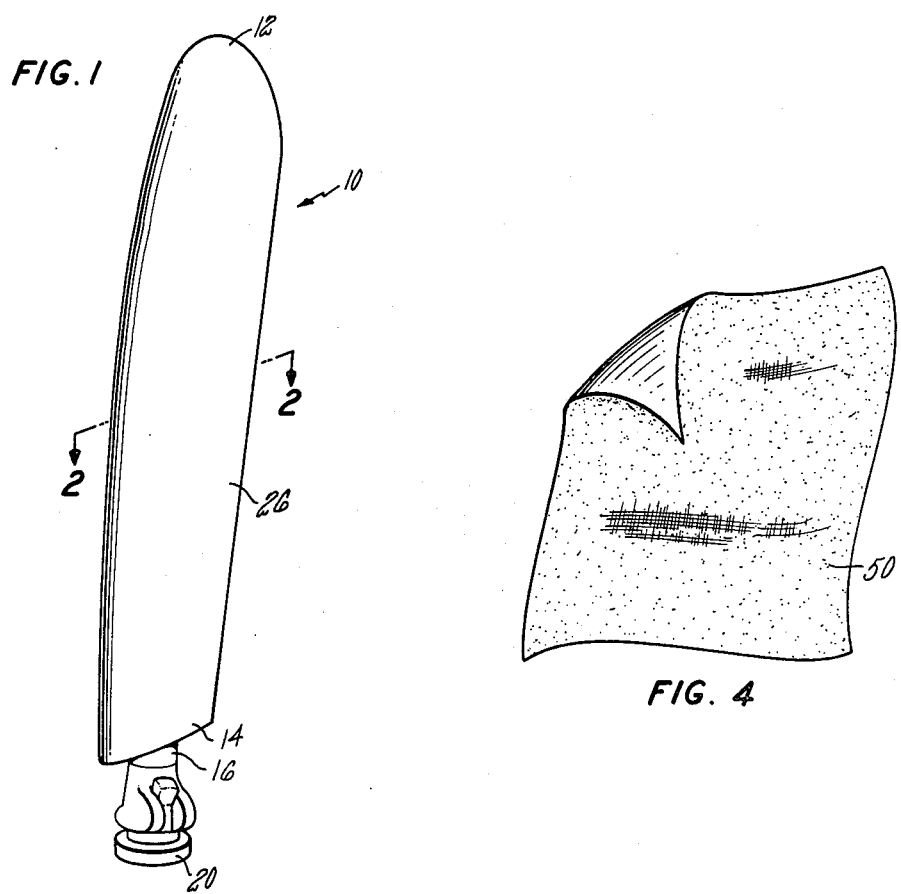
FIG. 1
FIG. 4
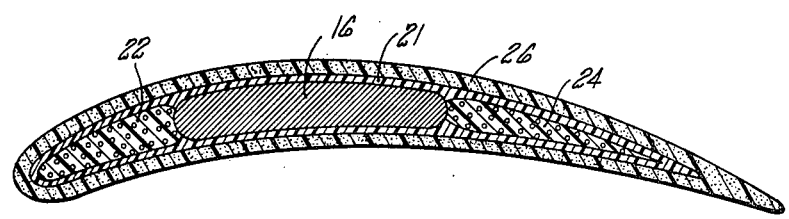
FIG. 2

MANUFACTURE OF FIBER REINFORCED ARTICLES

TECHNICAL FIELD

This invention relates to a time and cost saving improvement in the manufacture of fiber reinforced articles such as airfoil blades employed in aircraft propellers.

BACKGROUND ART

The high strength and low weight characteristics of fiber reinforced articles have in recent years accounted, at least in part, for the popularity of such articles over metallic articles manufactured by such prior art processes as the machining, casting or forging of a plurality of metallic component parts and the subsequent assembly of such parts. The wide range of shapes and the resulting minimization of required component parts associated with fiber reinforced articles has also contributed to such popularity. An example of a modern method for manufacturing reinforced fiber aircraft propeller blades is disclosed in U.S. patent application Ser. No. 193,519 filed Oct. 2, 1980, in the name of Harry A Nutter, Jr., and entitled "Method of Making Fiber Reinforced Articles".

In the Ser. No. 193,519 patent application, an aircraft propeller blade is manufactured by first, forming a spar-foam subassembly by providing a structural spar of a material such as aluminum, coating the spar with a thermosetting adhesive and molding a thermosetting adhesive coated foam about the leading and trailing surfaces of the spar. A fiber reinforced skin or covering is then formed about the exterior of the spar-foam subassembly. As set forth in greater detail in the Ser. No. 193,519 application, the covering comprises a number of layers of woven fiberglass cloth, each layer retained in position over the spar-foam subassembly by stitching. Thereafter, a liquid plastic such as a synthetic polymerizable material is vacuum injection molded into the cloth and then cured. Those skilled in the art of manufacturing reinforced fiber articles will readily appreciate that stitching a plurality of cloth layers about a form such as the spar-foam subassembly requires substantial time and therefore contributes significantly to the manufacturing costs of such an article. In particular, where the article is of significant dimension and substantially complex shape, the stitching is often required to be performed by hand in a relatively time consuming fashion.

Accordingly, it is a principal object of the present invention to provide an improved method of manufacturing fiber reinforced articles.

It is another object to provide such a method characterized by enhanced economy and ease of performance.

It is another object to provide such a method wherein the time required for securing fibrous material to a form or subassembly prior to injection molding with a thermosetting substance, is minimized.

It is another object to provide such a method wherein such securing of the fibrous material to the form does not adversely affect the strength of the fibrous material or the finished article.

DISCLOSURE OF INVENTION

In accordance with the present invention, in the manufacture of a fiber reinforced article such as an aircraft propeller blade, fibrous material is secured to a form or subassembly by minute quantities of a thermoplastic adhesive disposed over one surface of the fibrous material whereby layers of fibrous material may be secured to adjacent layers by adhesive bonding with heat and pressure either locally or over a large area of the material rather than by stitching with filamentary material. The fibrous material may comprise a cloth in sheet form such as a woven fiberglass cloth. The adhesive may comprise any suitable thermoplastic, melt processable adhesive, for instance, a polyamide, such as a nylon-12 copolymer in finely divided form uniformerly deposited over a single surface of the cloth. In the production of aircraft propeller blades, the adhesive is adhered to the surface of the glass cloth in a particle size in the range of 100-400 microns (35-150 mesh) and a density of 0.5-5.0 grams per square yard of cloth, such a density eliminating the risk of interference by the thermoplastic adhesive with the flow of a thermosetting resin molded into the fibrous material in a subsequent operation.

BRIEF DESCRIPTION OF DRAWINGS

FIG. 1 is a perspective view of an aircraft propeller blade typical of a fiber reinforced article which may be manufactured in accordance with the method of the present invention;

FIG. 2 is a cross-sectional view of the blade of FIG. 1 taken in the direction of line 2—2 thereon;

FIG. 4 is a plan view of the fibrous material illustrating the presence of the adhesive on one surface of the material.

BEST MODE FOR CARRYING OUT THE INVENTION

Figure 3:
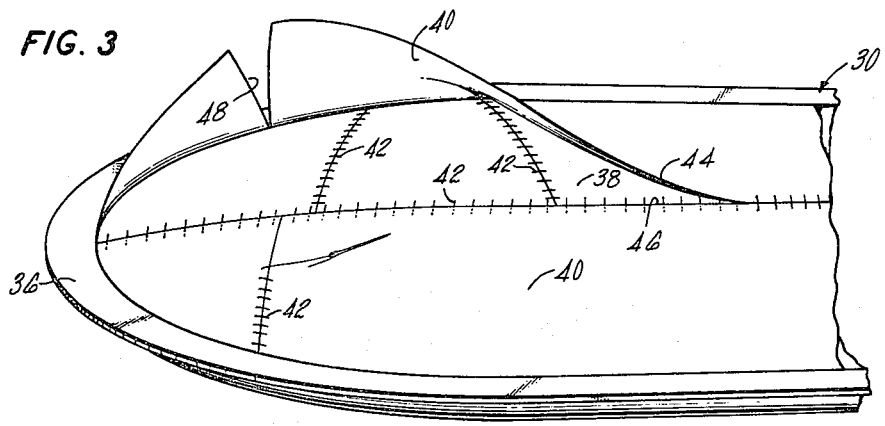
FIG. 3 is a perspective view of a known technique for laying up a fibrous material in forming the outer-most portion of the blade shown in FIGS. 1 and 2.

The present invention relates to an improved method for manufacturing fiber reinforced articles in general. The invention is applicable to the manufacture of fiber reinforced articles wherein a multiplicity of fibrous sheets are laid up within a mold and/or about the surface of a form. For purposes of illustration, this improved method is described hereinafter with respect to the manufacture of an aircraft propeller blade. However, it will be understood by those skilled in the art that this method may be employed with equal utility in the manufacture of fiber reinforced articles of any desired shape wherein bonded attachment of dry fibrous laminations to a form or subassembly prior to molding is desirable.

Referring to FIG. 1, an aircraft propeller blade is shown, the blade comprising an elongate airfoil shaped section 10 having an outer tip portion 12 and an inner butt portion 14. The airfoil shaped portion is fixed to a spar 16 formed typically from aluminum or the like, the spar extending substantially the entire length of the airfoil and including a butt end 20 thereon by which the blade is attached to a suitable hub (not shown).

Referring to FIG. 2, in cross section, the blade comprises the spar coated on the surfaces thereof with a suitable adhesive 21, for instance, a thermosetting, nonvolatile modified epoxy liquid adhesive. Adhesive 21 bonds leading and trailing foam filler portions 22 and 24, respectively, to spar 16 at the leading and trailing surfaces thereof. Portions 22 and 24 comprise, for example, a two component, semi-prepolymer rigid urethane foam.

As disclosed in detail in the U.S. patent application to Nutter cited hereinabove, spar 16, leading and trailing foam filler portions 22 and 24 and adhesive 20 are formed into a blade assembly by a molding process wherein spar 16 is coated with adhesive 20 and disposed within a mold (not shown) having a suitably shaped interior cavity therein also precoated with adhesive 20. Following the insertion of the spar, a foamable material is injected into the mold adjacent the leading and trailing edges of the spar. The materials within the mold are then heated to achieve partial curing of adhesive 20 and foaming of portions 22 and 24. The spar-foam subassembly comprising the adhesive coated spar and the attached foam portions is then removed from the mold. The blade is completed by wrapping the subassembly with a fibrous material which is then impregnated with a suitable plastic such as a thermosetting resin by vacuum injection molding to form an outer layer (skin) 26 of the airfoil. This final molding process is described in detail in the hereinabove-cited application to Nutter.

For dimensional accuracy, in forming skin 26, it is necessary to wrap the subassembly with the fibrous material in as smooth a fashion as possible. Heretofore, it has been the practice to provide the fibrous material in flexible sheet form and tailor the fibrous material to the blade subassembly, such tailoring involving various measuring, hand cutting, fitting and attaching operations as would be involved in the tailoring in general of any flexible sheet material to a desired contour or form. Such tailoring is shown in FIG. 3, wherein there is illustrated a female mold half 30 in which the spar-foam subassembly and the sheets of fibrous material are received. The sheets are fitted in situ within mold half 30 to fill the cavity defined by this mold half and a corresponding mold half (not shown). The mold halves are then assembled with the sheet-covered subassembly for molding the thermosetting resin into the fibrous material.

Typically, a plurality of overlaying sheets of the fibrous material are laid in the mold half 30 prior to inserting the spar-foam subassembly therein. The subassembly is then inserted in the mold half on top of the fibrous material sheets each of which is then individually folded over the subassembly, cut and fit thereto and attached to itself. In FIG. 3, two fibrous sheets 38 and 40 are shown. As set forth hereinabove, these sheets may be formed from any fibrous material of suitable strength, flexibility and compatibility with the thermosetting resin subsequently injected therein. By way of example, the fibrous sheets may comprise a woven fiberglass cloth. In FIG. 3, layer 38 has been tailored around the spar-foam subassembly by trimming excess material off the periphery of the sheet, excising various portions of the sheet so that the sheet may be wrapped around the blade subassembly without any folds or gathers and then hand stitched as at 42. Sheet 38, cut and stitched in this manner forms a tailored sheath about the spar-foam subassembly and any underlying fabric sheets. Sheet 40 is shown being stitched to itself over sheet 38, sheet 40 already having been trimmed about the periphery thereof to define edges 44 and 46 which meet along a straight longitudinal seam. Also shown in sheet 40 is a wedge shaped cutout 48, the edges of which are to be sewn together in a seam branching off the longitudinal seam in a manner similar to corresponding seams shown in sheet 38.

It will be appreciated by those skilled in the art that such hand tailoring and sewing of each individual cloth sheet about the blade subassembly involves a considerable portion of the overall time and expense involved in the manufacture of the associated fiber reinforced article. The sewing of each sheet to itself has been required to prevent movement of the sheets as subsequent sheets are laid up and to prevent movement of the sheets when the mold is closed for the final vacuum injection molding of the thermosetting resin into the sheets. With the present invention, such hand sewing is eliminated and the time required for the fabric layup is reduced by providing the fabric sheets on one surface thereof with minute amounts of a finely divided thermoplastic adhesive. Referring to FIG. 4, a portion of a woven fiberglass cloth sheet is shown, a single surface of the sheet having disposed thereon, a minute amount of a thermoplastic adhesive 50 such as a polyamide. While in the preferred embodiment, a nylon-12 copolymer is employed, it will be understood that the invention is not so limited, any thermoplastic adhesive of a suitable melting point and compatible with the thermosetting resin and fibrous material employed in outer layer 26 being suitable. The thermoplastic adhesive is provided on the sheet in the minimum density required for attaching the sheet to an adjacent fabric sheet surface with a bond strong enough to prevent relative movement of the sheets as they are laid up on one another within the mold and as the mold is closed. The adhesive need not lend any strength to the fiber reinforced article, such strength deriving from the saturation of the sheet material with the subsequently molded thermosetting resin. Where the sheet material comprises a woven fiberglass cloth, and the fiber reinforced article comprises a propeller blade, the thermoplastic adhesive 50 may be applied to the sheet material in a density of from 0.5–5.0 grams per square yard of material in particles in the range of 100–400 microns (35–150 mesh) in size. However, various other densities and particle sizes will suggest themselves to those skilled in the art depending on the nature of the fibrous materials used, the geometry of the fibrous material lay-up and the type of thermosetting adhesive subsequently employed. The adhesive may be deposited on the fibrous material by any known technique such as providing the fibrous material in a web form and depositing particles of the adhesive on the web. The web may of course be heated during the adhesive deposition to cause the adhesive to adhere thereto.

Figure 5:
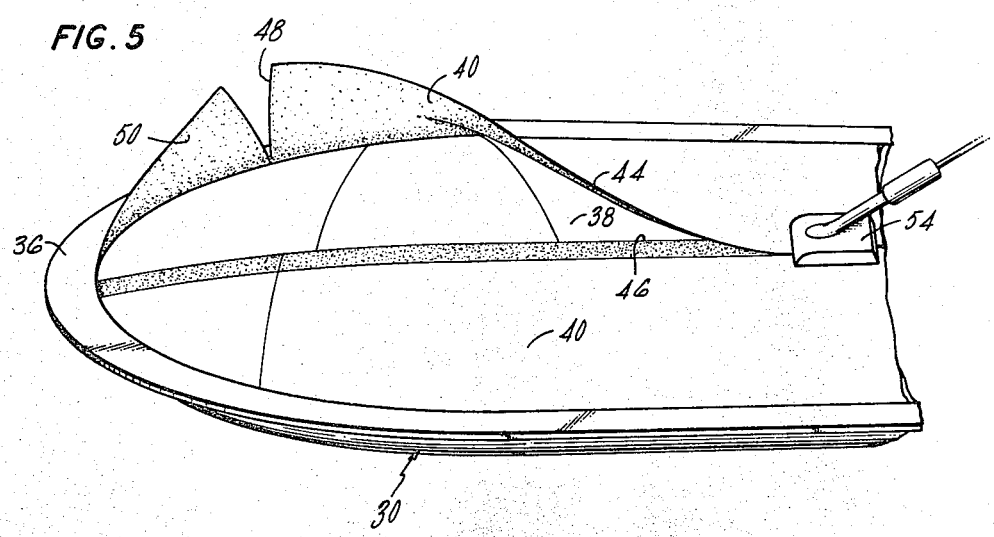
FIG. 5 is a perspective view of the laying up of fibrous material forming the outer covering of the blade shown in FIGS. 1 and 2 in accordance with the present invention.

Referring to FIG. 5, there is shown mold 30 with the spar-foam subassembly disposed therein over a number of layers of cloth in the manner discussed with regard to FIG. 3, the outer two layers 38 and 40 being specifically illustrated. The cloth sheets are laid up on one another such that the surface of each sheet having adhesive 50 thereon is placed against the preceding sheet. Thus, the outer surface of each sheet is free of adhesive. The sheet material is cut in the same manner as that described with respect to FIG. 3. However, as shown in FIG. 4, each fabric layer is secured to an adjacent layer by bonding with adhesive 50. The adhesive is activated by heat and pressure provided by the utilization of an electric resistance hand iron 54. The disposition of the adhesive on a single surface of the sheets allows the adhesive to be softened by the iron without actually contacting the iron to prevent fouling of the iron's surface. The temperature of iron 54 is set to exceed the melting point of the nylon-12 copolymer adhesive. As shown in FIG. 5, unlike the stitching process illustrated in FIG. 3 wherein each layer of fabric is sewn to itself, iron 54 adhesively secures each fabric layer to the preceding layer (and the first layer to the spar-foam subassembly) with sufficient strength to prevent relative movement of the layers as they are laid up on one another and as the mold halves are closed prior to the vacuum injection molding of the thermosetting resin into the fabric.

As illustrated in FIG. 5, attachment of the fabric layers 38 and 40 in this manner allows edge 46 of sheet 40 to be folded back, over sheet 40 and adhesively secured by iron 54 to edge 44 before either of these edges are trimmed. The excess material may then be trimmed simultaneously from both edge portions thereby saving one edge trimming operation in the fibrous material lay-up.

As set forth hereinabove, while the process of the present invention has been illustrated in the manufacture of a propeller blade, it will be appreciated by those skilled in the art that the process is equally suitable for the manufacture of any fiber reinforced article such as various other propeller system components (spinners, afterbodies, etc.) or fiber reinforced articles for any other use. The method has been illustrated herein as utilizing a nylon-12 copolymer deposited on a woven fiberglass cloth. However, it will be appreciated that various materials may be used with equal utility depending upon the nature of the article being formed and the other materials such as the thermosetting resin employed in subsequent vacuum injection molding steps. Furthermore, while a hand iron has been described as a means for locally heating the adhesive, other equivalent techniques such as heated presses and the like may be used for heating the adhesive either locally or over a broad area of the fibrous material without departing from this invention. Accordingly, it will be understood that the present invention is not limited to the detailed description thereof but rather, includes any equivalent modifications thereto as will suggest themselves to those skilled in the art. It is therefore intended by the following claims to cover such modifications as fall within the true spirit and scope of the invention.

Having thus described the invention, what is claimed is:

1. A method for manufacturing a fiber reinforced article, said method comprising the steps of providing a subassembly form of the desired shape of said fiber reinforced article, enveloping said subassembly form with fibrous reinforcing material, impregnating said fibrous material with a curable adhesive and molding said impregnated fibrous material into an outer skin of said fiber reinforced article in conformance with the shape of said subassembly form, said method, prior to the molding of said fibrous material into said skin, being characterized by the steps of providing said fibrous material in a plurality of sheets, each being unimpregnated with any binder and having a minute quantity of thermoplastic adhesive deposited on a single surface thereof; and laying up said fibrous material sheets, one over another on said subassembly while bonding a first of said sheets to said subassembly form and each subsequent sheet to a preceding adjacent sheet by heat and pressure.

2. The method of claim 1 characterized by said heat and pressure being applied at discrete locations on said fibrous material.

3. The method of claim 1 characterized by said heat and pressure being applied to said fibrous material over a broad expanse thereof.

4. The method of claim 1 characterized by said fibrous material sheets being laid up such that the thermoplastic adhesive on each sheet is disposed in contact with a preceding adjacent sheet.

5. The method of claim 1 characterized by said bonding of each sheet to said preceding adjacent sheet being manually effected by means of an iron maintained at the softening temperature of said adhesive.

6. The method of claim 1 characterized by the deposition of said adhesive being in the range of approximately 0.5 to approximately 5.0 grams of adhesive per square yard of material.

7. The method of claim 1 characterized by said fibrous sheet material comprising a woven fiberglass cloth.

8. The method of claim 1 characterized by said thermoplastic adhesive comprising a synthetic polymeric material.

9. The method of claim 8 characterized by said synthetic polymeric material comprising a nylon-12 copolymer.

* * * * *